United States Patent
Ishii

(10) Patent No.: US 6,185,260 B1
(45) Date of Patent: Feb. 6, 2001

(54) RADIO COMMUNICATION DEVICE USING QUADRATURE MODULATION-DEMODULATION CIRCUIT

(75) Inventor: Junichi Ishii, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/087,301

(22) Filed: May 29, 1998

(30) Foreign Application Priority Data

May 30, 1997 (JP) .................................................. 9-141464

(51) Int. Cl.[7] .................................................. H04L 27/10
(52) U.S. Cl. .............................................. 375/279; 455/83
(58) Field of Search .................................. 375/269, 273, 375/279, 308, 329, 259, 220; 455/24, 73, 78, 83, 560

(56) References Cited

U.S. PATENT DOCUMENTS

| | | | |
|---|---|---|---|
| 5,613,226 | * 3/1997 | Kanami | 455/115 |
| 5,628,059 | 5/1997 | Kurisu . | |
| 5,642,378 | * 6/1997 | Denheyer et al. | 375/216 |
| 5,712,870 | * 1/1998 | Petrick | 375/206 |
| 5,818,827 | * 10/1998 | Usui et al. | 370/344 |
| 5,896,419 | * 4/1999 | Suzuki | 375/219 |
| 5,982,807 | * 11/1999 | Snell | 375/200 |

FOREIGN PATENT DOCUMENTS

| | | |
|---|---|---|
| 2 274 759 | 8/1994 | (GB) . |
| 2 323 502 | 9/1998 | (GB) . |
| 3-89750 | 4/1991 | (JP) . |
| 3-89751 | 4/1991 | (JP) . |
| 6-268553 | 9/1994 | (JP) . |
| 8-32462 | 2/1996 | (JP) . |
| 10-79693 | 3/1998 | (JP) . |
| WO 92/11703 | 7/1992 | (WO) . |

\* cited by examiner

*Primary Examiner*—Chi H. Pham
*Assistant Examiner*—Emmanuel Bayard
(74) *Attorney, Agent, or Firm*—Scully, Scott, Murphy & Presser

(57) ABSTRACT

A radio communication device using a quadrature modulation-demodulation circuit which enables DC offset error fluctuation to be corrected more accurately regardless of the condition of temperature variation or power source voltage fluctuation. A quadrature demodulation circuit inputs therein a QPSK signal to output a base band signal perpendicularly intersecting to the QPSK signal. A base band signal generation circuit inputs therein a transmission data to convert into two analog base band signals perpendicularly intersecting with each other. A quadrature modulation circuit inputs therein the analog base band signal and modulated frequency signal to output the QPSK signal. A switching circuit selects either one of the analog base band signal and the QPSK signal. An A/D conversion circuit quantizes an output signal of the switching circuit. An offset error detecting means detects DC offset error. Consequently, the radio communication device causes the DC offset error caused by temperature variation and power source voltage fluctuation to be reduced regardless of on operation.

7 Claims, 3 Drawing Sheets

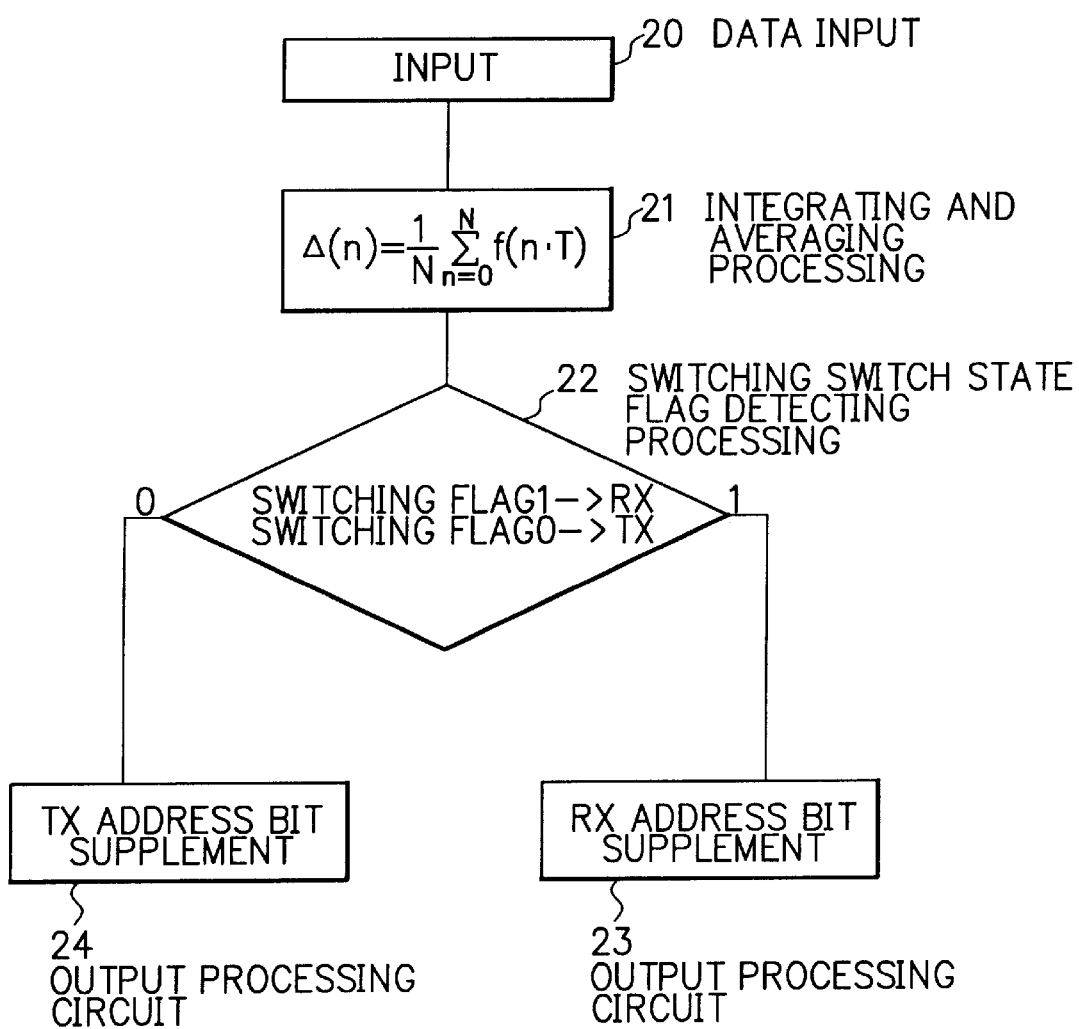

RADIO COMMUNICATION DEVICE USING QUADRATURE MODULATION-DEMODULATION CIRCUIT

BACKGROUND OF THE INVENTION

The present invention relates to a radio communication device using quadrature modulation demodulation circuit for implementing correction of DC offset error fluctuation caused by power source voltage fluctuation of the circuit or circumferential temperature variation.

DESCRIPTION OF THE RELATED ART

Formerly, a radio communication device using a quadrature modulation-demodulation circuit is generally in use for digital communication. The current cellular system proceeds to the digital communication system such as the IS-136 system using π/4·DQPSK signal in North America or the GSM system using GMSK signal in Europe and so forth from the analog communication system using FM signal. In these digital communication systems, a synchronous detection circuit for reception and a quadrature modulation circuit for transmission are in use universally.

FIG. 1 shows a configuration of transmitter-receiver circuit of general digital cellular system according to conventional example 1. A signal outputted from a base station is inputted to an antenna 1 through a radio line, thus being received at a channel-select circuit 2 in response to an output frequency of a local oscillation circuit 12, then the signal is amplified to be outputted. The signal outputted from the channel-select circuit 2 is inputted to a quadrature demodulation circuit 3, thus being subjected to synchronous detection to output both of an in-phase base band signal Sir and a quadrature base band signal Sqr.

Each of the in-phase base band signal Sir and the quadrature base band signal Sqr is inputted to a DC offset adjusting circuit 4, thus causing a DC offset value thereof to be adjusted in response to a reception DC offset adjusting signal Sar set beforehand in the DC offset adjusting circuit 4, before being outputted. The output signal of the DC offset adjusting circuit 4 is inputted to an A/D conversion circuit 5, thus being quantized to be outputted.

The in-phase base band signal Sir and the quadrature base band signal Sqr which are quantized in the A/D conversion circuit 5 are subjected to data demodulation in a digital signal processing section 6 respectively, thus also being subjected to processing of error correction and so forth to be outputted. On the other hand, transmission data outputted from the digital signal processing circuit 6 is converted into an in-phase base band signal Sit and a quadrature base band signal Sqt in a base band signal generation circuit 8 to be outputted. The in-phase base band signal Sit and the quadrature base band signal Sqt are inputted to a DC offset adjusting circuit 9, thus causing a DC offset error to be adjusted based on a transmission DC offset adjusting signal Sat which is set beforehand, before being inputted respectively to a quadrature demodulation circuit 10.

The quadrature demodulation circuit 10 inputs thereto an output of a local oscillation circuit 13, above described in-phase base band signal Sit, and the above described quadrature base band signal Sqt, thus outputting a signal of radio frequency band which is demodulated. The output of the quadrature demodulation circuit 10 is subjected to power amplification by a power amplifier 11, before being transmitted through the antenna 1. The reception DC offset adjusting signal Sar and the transmission DC offset adjusting signal Sat whose values adjusted in adjusting process at the time of production are stored in memory, are outputted through a CPU 7.

Consequently, when realizing a radio communication device using quadrature modulation-demodulation circuit, the DC offset error involved in the in-phase base band signal Sit and the quadrature base band signal Sqt outputted from the base band signal generation circuit is adjusted to be set in every device in the production process.

The Japanese Patent Application Laid-Open No. HEI 08-32462 by way of the conventional example 2 discloses "DC OFFSET CIRCUIT OF CARTESIAN LOOP". In the conventional example 2, it causes DC offset of an operational amplifier for demodulation to be implemented in every time transmission starting, so that drift caused by temperature variation or power fluctuation or the like is absorbed to obtain appropriate balance of demodulation-modulation circuit, and fluctuation caused by difference of transmitter is absorbed to obtain appropriate balance of demodulation-modulation circuit at all times.

However, the radio communication device using quadrature modulation demodulation circuit shown in the above-described conventional example involves problem that it is incapable of implementing accurately correction of erroneous fluctuation of DC offset caused by power voltage fluctuation of the circuit or circumferential temperature variation. On the other hand, in the above described digital cellular system, there becomes problem that how to remove unnecessary sprious generated by these DC offset error.

SUMMARY OF THE INVENTION

In view of the foregoing, it is an object of the present invention to provide a radio communication device using a quadrature modulation-demodulation circuit which enables erroneous fluctuation of DC offset to be corrected more accurately.

In one arrangement to be described below by way of example in illustration of the invention, a radio communication device using a quadrature modulation-demodulation circuit, includes a quadrature demodulation circuit for inputting a QPSK signal to output a base band signal perpendicularly intersecting with the QPSK signal inputted thereto, a base band signal generation circuit which inputs a transmission data to convert into two analog base band signals perpendicularly intersecting each other, before outputting them a quadrature modulation circuit which inputs both of the analog base band signal and a modulated frequency signal, thus outputting the QPSK signal, a switching circuit inputting thereto both of the analog base band signal and the QPSK signal, thus selecting either one of two signals to be outputted, an A/D conversion circuit inputting thereto an output signal of the switching circuit, thus quantizing the output signal to be outputted, offset error detecting means inputting thereto an output signal of the A/D conversion circuit to detect a DC offset error, and a DC offset error adjusting circuit for correcting DC offset error involved in the analog base band signal and the QPSK signal, wherein when the analog base band signal is selected in the switching circuit, the radio communication device using modulation-demodulation circuit causes the DC offset error to be corrected.

In one particular arrangement to be described in illustration of the present invention, by way of example, the radio communication device using the quadrature modulation-demodulation circuit, wherein the offset error detecting means integrates signal outputted from the A/D conversion circuit during prescribed time period to detect the DC offset error.

In another particular arrangement to be described in illustration of the present invention, by way of example, the radio communication device using the quadrature modulation-demodulation circuit, wherein the offset error detecting means, when the analog base band signal is selected in the switching circuit, causes a data pattern in which the analog base band signal swings in between plus side and minus side with equi-ratio to be used by way of transmission data.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 3 is a view showing processing procedure for explaining operation example.

DETAILED DESCRIPTION OF THE PREFERRED EMBODIMENTS

Figure 1:
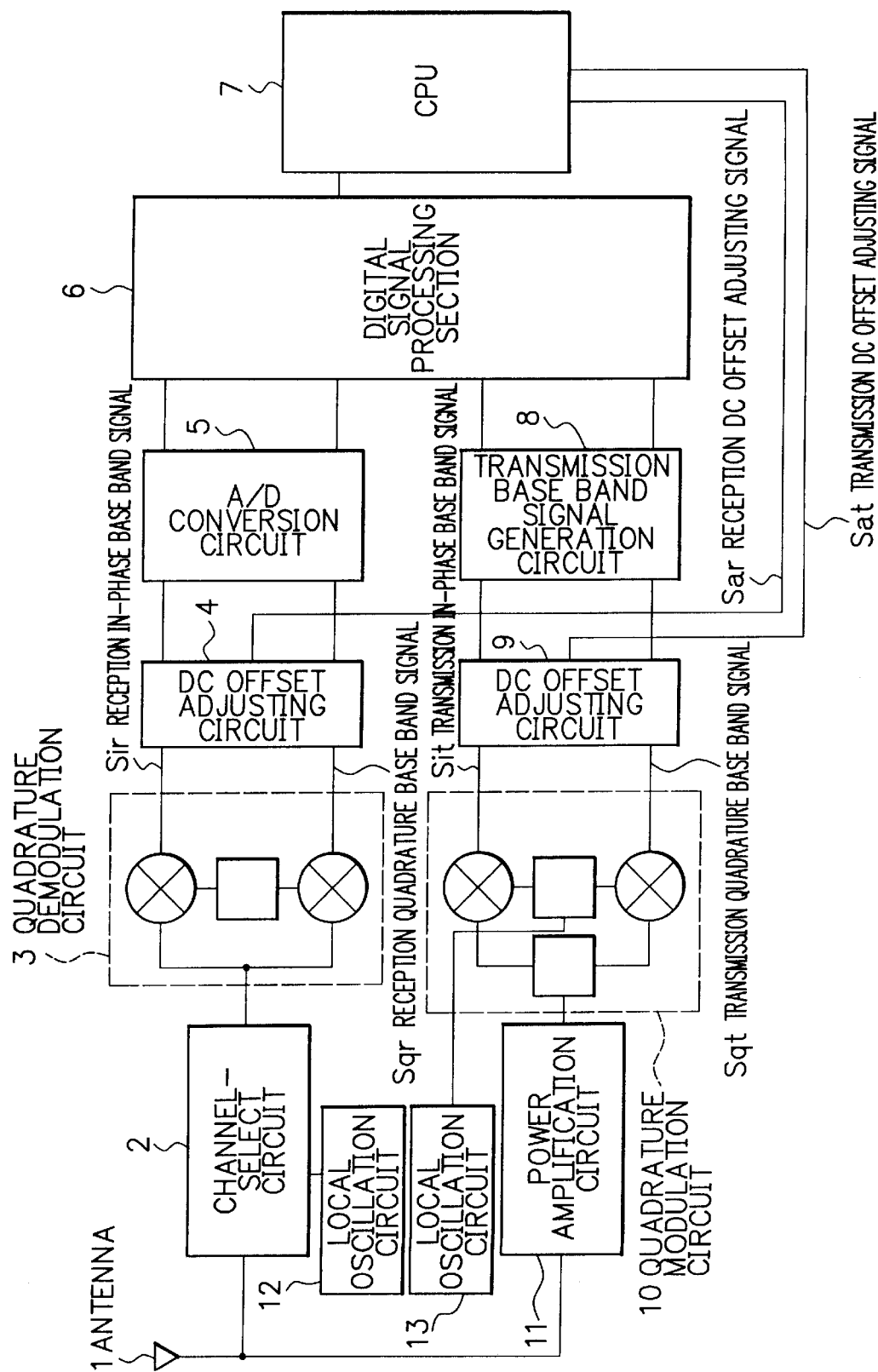
FIG. 1 is a block diagram showing configuration example of conventional radio communication device.
Figure 2:
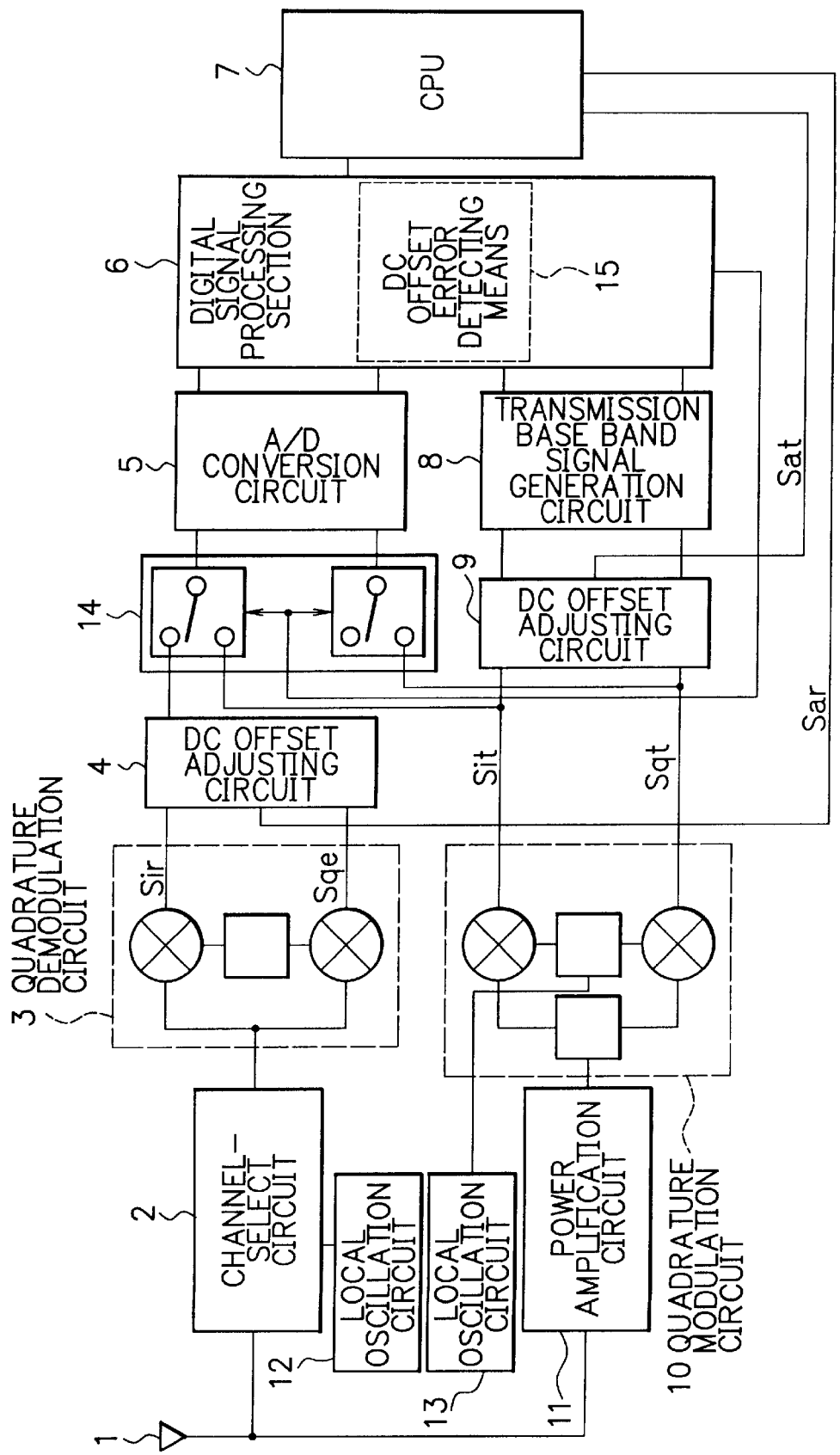
FIG. 2 is block configuration view showing an embodiment of the radio communication device using quadrature modulation-demodulation circuit according to the present invention.

A preferred embodiment of a radio communication device using a quadrature modulation-demodulation circuit according to the present invention will now be described in detail referring to the accompanying drawings. Referring to FIGS. 2 and 3, one embodiment of the radio communication device using quadrature modulation-demodulation circuit of the present invention is shown.

In FIG. 2, the radio communication device using the quadrature modulation-demodulation circuit of the present invention comprises an antenna 1, a channel-select circuit 2, a quadrature demodulation circuit 3, a DC offset adjusting circuit 4, a switching circuit 14, an A/D conversion circuit 5, a digital signal processing circuit 6, a local oscillation circuit 12, a local oscillation circuit 13, a power amplification circuit 11, a quadrature modulation circuit 10, a DC offset adjusting circuit 9, a base band signal generation circuit 8, a DC offset error detecting means 15, and a CPU 7.

A signal outputted from a base station is inputted by the antenna 1 through a radio line, then in the channel-select circuit 2, the signal is received in answer to an output frequency of the local oscillation circuit 12, thus being amplified to be outputted. The signal outputted from the above-described channel-select circuit 2 is inputted to the quadrature demodulation circuit 3, thus being subjected to synchronous detection to output a reception in-phase base band signal Sir and a reception quadrature base band signal Sqr.

Each of the reception in-phase base band signal Sir and the reception quadrature base band signal Sqr is inputted to the DC offset adjusting circuit 4. The inputted signals whose DC offset value is adjusted due to a reception DC offset adjusting signal Sar in the DC offset adjusting circuit 4, before being outputted. The output of the above-described DC offset adjusting circuit 4 is inputted to the switching circuit 14. When the output of the DC offset adjusting circuit 4 which output is the output of the above-described quadrature demodulation circuit 3 is selected in the switching circuit 14, the reception in-phase base band signal Sir and the reception quadrature base band signal Sqr inputted to the A/D conversion circuit 5 are quantized to be outputted respectively.

Each of the reception in-phase base band signal Sir and the reception quadrature base band signal Sqr quantized in the above-described A/D conversion circuit 5 is subjected to data demodulation in the digital signal processing section 6, thus also being subjected to processing of error correction and so forth to be outputted. Further, the reception in-phase base band signal Sir and the reception quadrature base band signal Sqr which are quantized in the above-described A/D conversion circuit 5 are also inputted simultaneously to the DC offset error detecting means 15 of the above-described digital signal processing section 6, so that it causes DC offset error information detected due to the DC offset error detecting means 15 to be outputted to the CPU 7 while adding ID capable of being recognized by way of DC offset error information of a reception base band signal.

On the other hand, transmission data outputted from the above-described digital signal processing section 6 is converted into a transmission in-phase base band signal Sit and a transmission quadrature base band signal Sqt to be outputted.

Each of the transmission in-phase base band signal Sit and the transmission quadrature base band signal Sqt is inputted to the DC offset adjusting circuit 9, thus the DC offset error thereof is adjusted based on a transmission DC offset adjusting signal Sat which is set beforehand, before being inputted to the quadrature modulation circuit 10 and the switching circuit 14 respectively. The quadrature modulation circuit 10 inputs an output of the local oscillation circuit 13, and the above-described transmission in-phase base band signal Sit and the above-described transmission quadrature base band signal Sqt, thus outputting signal of radio frequency band which is modulated.

The above-described output of the quadrature modulation circuit 10 is subjected to power amplification by the power amplifier 11, before transmitting through the antenna 1. In the switching circuit 14 which is the another destination for outputting of the above described DC offset adjusting circuit 9, when the transmission in-phase base band signal Sit and the transmission quadrature base band signal Sqt which are the outputs of the above DC offset adjusting circuit 9 are selected, these signals are inputted to the A/D conversion circuit 5 which is the same case that the output of the DC offset adjusting circuit 4 which is the output of the quadrature demodulation circuit 3 is selected, thus being quantized to be outputted to the digital signal processing section 6.

Each of the transmission in-phase base band signal Sit and the transmission quadrature base band signal Sqt quantized in the above-described A/D conversion circuit 5 is inputted simultaneously to the DC offset error detecting means 15 of the digital signal processing section 6 so that it causes DC offset error information detected due to the DC offset error detecting means 15 to be outputted to the CPU 7 while adding ID capable of being recognized by way of DC offset error information of a reception base band signal.

The DC offset error information both of the reception base band signal and transmission base band signal which are outputted from the above described digital signal processing section 6 are inputted to the above described CPU 7, thus being converted into a reception DC offset adjusting signal Sar and a transmission DC offset adjusting signal Sat which are the signal causes DC offset error both of the reception base band signal and the transmission base band signal to be denied respectively, before being fed back both to the above-described DC offset adjusting circuit 4 and the above-described DC offset adjusting circuit 9.

Next, operation of the above-described DC error detecting means 15 which is a feature of the present invention will be described in detail referring to FIG. 3.

Two-kind of data of "in-phase" and "quadrature" which are quantized with sampling cycle T in the above A/D conversion circuit 5 to be inputted to the above digital signal processing section 6 is integrated during time period of N times of sampling cycle T which is sufficiently larger time than each reception (transmission) base band signal cycle τ, thus average value is obtained in an integrating and averaging processing step 21.

If there is no DC offset error in the base band signal, and to be a randomized reception (transmission) base band signal and as long as it continues to be integrated during sufficiently longer time than the cycle, a result of the above integrating and averaging processing step 21 denotes 0 (zero). Consequently, the above-described integrating and averaging processing step 21 enables the DC offset errors corresponding to several LSBs of the above-described A/D conversion circuit 5 to be obtained.

The output of the integrating and averaging processing step 21 is inputted to a switching switch state flag detecting processing step 22. In the switching switch state flag detecting processing step 22, when detecting a selection state of an RX base band signal, it causes an RX address bit to be a DC offset error information of the reception base band signal to be supplemented to append ID in the output processing circuit 23. While when detecting a selection state of a TX base band signal, it causes a TX address bit to be a DC offset error information of the transmission base band signal to be supplemented to append ID in the output processing circuit 24. Among the above-described explanation, regardless of reception/transmission, the DC offset error of the in-phase base band signal and the quadrature base band signal are processed independently each other.

The output of the DC offset adjusting circuit adjusting the DC offset error involved in the output of the quadrature demodulation circuit and the output of the DC offset adjusting circuit adjusting the DC offset error involved in the transmission base band signal are inputted to the switching circuit. In the offset error detecting means for detecting the DC offset error involved in the output of the switching circuit, it causes the DC offset error to be detected, thus correcting both the output of the DC offset adjusting circuit of the above described reception base band signal and the DC offset error involved in the DC offset adjusting circuit of the above described transmission base band signal.

The radio communication device of the present invention corrects the output of the DC offset adjusting circuit of the reception base band signal and the DC offset error involved in the output of the DC offset adjusting circuit of the transmission base band signal at periodic intervals. Consequently, it is capable of reducing the DC offset error caused by temperature variation or power source voltage fluctuation.

As described above, the radio communication device using the quadrature modulation-demodulation circuit according to the present invention outputs the analog base band signal and the QPSK signal from the modulated frequency signal, then each one of the signals both of the analog base band signal and the QPSK signal to be selected to output, thus quantizing the output signal so that it causes the DC offset error involved in the analog base band signal and QPSK signal to be corrected. According to the processing procedure, it is capable of reducing the DC offset error caused by temperature variation or power source voltage fluctuation even if the present radio communication device is on operation.

While preferred embodiments of the invention have been described using specific terms, such description is for illustrative purpose only, and it is to be understood that changes and variations may be made without departing from the spirit or scope of the following claims.

What is claimed is:

1. A radio communication device using a quadrature modulation-demodulation circuit comprising:
   a quadrature demodulation circuit inputting thereto a QPSK signal to output a base band signal perpendicularly intersecting to said QPSK signal;
   a base band signal generation circuit which inputs thereto a transmission data to convert into two analog base band signals perpendicularly intersecting each other, before outputting them;
   a quadrature modulation circuit which inputs thereto both of said analog base band signal and a modulated frequency signal, thus outputting said QPSK signal;
   a switching circuit inputting thereto both of said analog base band signal and said QPSK signal, thus selecting either one of two signals to output;
   an A/D conversion circuit inputting an output signal of said switching circuit, thus quantizing said output signal to output;
   offset error detecting means inputting thereto an output signal of said A/D conversion circuit to detect a DC offset error; and
   a DC offset error adjusting circuit for correcting DC offset error involved in said analog base band signal and said QPSK signal,
   wherein when said analog base band signal is selected in said switching circuit, it causes said DC offset error to be corrected.

2. A radio communication device using a quadrature modulation-demodulation circuit as claimed in claim 1, wherein said offset error detecting means integrates signal outputted from said A/D conversion circuit during prescribed time period to detect said DC offset error.

3. A radio communication device using a quadrature modulation-demodulation circuit as claimed in claim 2, wherein said offset error detecting means, when said analog base band signal is selected in said switching circuit, causes a data pattern in which said analog base band signal swings in between plus side and minus side with equi-ratio to be used by way of transmission data.

4. A signal processing method of a radio communication device using a quadrature modulation-demodulation circuit comprising the steps of:
   outputting a base band signal perpendicularly intersecting with a QPSK signal inputted thereto by means of a quadrature demodulation circuit;
   inputting a transmission data to convert into two analog base band signals, before outputting them by means of a base band signal generation circuit;
   inputting both of said analog base band signal and a modulated frequency signal, thus outputting said QPSK signal by means of a quadrature modulation circuit;
   inputting thereto both of said analog base band signal and said QPSK signal, thus selecting either one of two signals to output by means of a switching circuit;

inputting thereto an output signal of said switching circuit, thus quantizing said output signal to output by means of an A/D conversion circuit;

inputting thereto an output signal of said A/D conversion circuit to detect a DC offset error by means of offset error detecting means; and correcting DC offset error involved in said analog base band signal and said QPSK signal by means of a DC offset error adjusting circuit, wherein when said analog base band signal is selected in said switching circuit, it causes said DC offset error to be corrected.

5. A signal processing method of a radio communication device using a quadrature modulation-demodulation circuit as claimed in claim 4, further comprising the step of:

integrating signal outputted from said A/D conversion circuit during prescribed time period to detect said DC offset error by means of offset error detecting means.

6. A signal processing method of a radio communication device using a quadrature modulation-demodulation circuit as claimed in claim 4, further comprising the step of:

causing a data pattern in which said analog base band signal swings in between plus side and minus side with equi-ratio to be used by way of transmission data by means of offset error detecting means, when said analog base band signal is selected in said switching circuit.

7. A signal processing method of a radio communication device using a quadrature modulation-demodulation circuit comprising the step of:

causing two-kind of data "in-phase" and "quadrature" to be quantized with sampling cycle T by means of A/D conversion circuit;

causing an average value of said A/D conversion circuit to be obtained while being integrated during time period of N times of said sampling cycle T which time period is sufficiently long time period than each reception (transmission) base band signal cycle $\tau$, thus average value is obtained in an integrating and averaging processing step;

enabling the DC offset errors corresponding to several LSBs to be obtained, since if there is no DC offset error in the base band signal, and to be a randomized reception (transmission) base band signal and as long as it continues to be integrated during sufficiently longer time than the cycle, and a result of the above integrating and averaging processing step denotes 0 (zero);

inputting the output of the integrating and averaging processing step to a switching switch state flag detecting processing step;

causing an RX address bit to be a DC offset error information of the reception base band signal to be supplemented to append when detecting a selection state of an RX base band signal, in the switching switch state flag detecting processing step; and causing a TX address bit to be a DC offset error information of the transmission base band signal to be supplemented to append ID in the output processing circuit, while when detecting a selection state of a TX base band signal, regardless of reception/transmission.

* * * * *